United States Patent [19]
Pettijohn

[11] Patent Number: 5,622,906
[45] Date of Patent: Apr. 22, 1997

[54] COMPOSITIONS USEFUL FOR OLEFIN POLYMERIZATION AND PROCESSES THEREFOR AND THEREWITH

[75] Inventor: Ted M. Pettijohn, Bartlesville, Okla.

[73] Assignee: Phillips Petroleum Company, Bartlesville, Okla.

[21] Appl. No.: 307,201

[22] Filed: Sep. 16, 1994

[51] Int. Cl.$^6$ .......................... C08F 4/626; C08F 4/633; C08F 10/00

[52] U.S. Cl. .......................... 502/104; 502/103; 502/113; 502/117; 502/125; 526/114; 526/116; 526/119; 526/943

[58] Field of Search .................................. 502/113, 104, 502/117, 125

[56] References Cited

U.S. PATENT DOCUMENTS

| | | | |
|---|---|---|---|
| 4,326,988 | 4/1982 | Welch et al. | 252/429 B |
| 4,363,746 | 12/1982 | Capshew | 252/429 B |
| 4,752,597 | 6/1988 | Turner | 502/104 |
| 4,808,561 | 2/1989 | Welbron, Jr. | 502/104 |
| 4,939,217 | 7/1990 | Stricklen | 526/114 |
| 4,962,248 | 10/1990 | Winter et al. | 585/12 |
| 4,962,262 | 10/1990 | Winter et al. | 585/512 |
| 5,001,244 | 3/1991 | Welborn, Jr. | 556/53 |
| 5,023,388 | 6/1991 | Luker | 585/9 |
| 5,032,562 | 7/1991 | Lo et al. | 502/111 |
| 5,081,322 | 1/1992 | Winter et al. | 585/9 |
| 5,082,882 | 1/1992 | Pettijohn | 524/47 |
| 5,120,696 | 6/1992 | Tsutsui et al. | 526/114 |
| 5,124,418 | 6/1992 | Welborn, Jr. | 526/114 |
| 5,145,818 | 9/1992 | Tsutsui et al. | 526/114 |
| 5,239,022 | 8/1993 | Winter et al. | 526/127 |
| 5,242,876 | 9/1993 | Shamshoum et al. | 526/119 |
| 5,258,344 | 11/1993 | Pettijohn | 502/111 |
| 5,262,487 | 11/1993 | Fujita et al. | 525/247 |
| 5,264,088 | 11/1993 | Brusson et al. | 204/59 R |
| 5,266,544 | 11/1993 | Tsutsui et al. | 502/113 |
| 5,354,721 | 10/1994 | Geerts | 526/133 |
| 5,411,925 | 5/1995 | Geerts et al. | 526/133 |

*Primary Examiner*—Edward J. Smith
*Attorney, Agent, or Firm*—Lucas K. Shay

[57] ABSTRACT

A composition, which can be used as catalyst for producing an olefin polymer having a multimodal molecular weight distribution, is provided that comprises a transition metal-containing catalyst, a metallocene, and a boron-containing organoaluminoxane, wherein each component of the composition is present in an effective amount so that an olefin polymer having a multimodal molecular weight distribution can be produced using the composition as catalyst, preferably in the presence of a cocatalyst. Also provided is a process for preparing the composition which comprises: (1) contacting a transition metal-containing catalyst with an organoaluminoxane dispersed in a solvent to form a slurry; (2) combining the slurry with a boroxine to prepare a combination of a transition metal-containing catalyst and boron-containing organoaluminoxane; and (3) contacting the combination with a metallocene. Further provided is a process for polymerizing an olefin to prepare an olefin polymer using the composition.

14 Claims, 1 Drawing Sheet

5,622,906

COMPOSITIONS USEFUL FOR OLEFIN POLYMERIZATION AND PROCESSES THEREFOR AND THEREWITH

FIELD OF THE INVENTION

The present invention relates to a composition useful for olefin polymerization, a process for preparing the composition, and a process for using the composition in olefin polymerization processes.

BACKGROUND OF THE INVENTION

Olefin polymers such as, for example, polyethylenes, are very important chemicals. For many applications of these polymers, toughness, strength, and environmental stress cracking resistance are important properties. Generally, these properties can be improved by increasing the molecular weight of the polymers. However, as the molecular weight of the polymers increases, the processability such as, for example, extrusion, molding, thermoforming, and rotational molding of the polymers decreases.

It is known that, the processability of the polymers can be improved by providing the polymers with a broad, bimodal, or multimodal molecular weight distribution in which the properties described above are attained and, in the mean time, the processability of the polymers is also improved. For example, olefin polymers having a multimodal molecular weight distribution process more easily, i.e., they can be processed at a faster throughput rate with lower energy requirement. Such polymers have reduced melt flow perturbations and are preferred due to improved properties for applications such as high strength films.

There are many known processes for producing olefin polymers having multimodal molecular weight distribution. However, each process has its own disadvantages; for example, an olefin polymer having a multimodal molecular weight distribution can be made by employing two distinct and separate catalysts in a polymerization reactor wherein each catalyst produces a polymer having a different molecular weight distribution. The catalyst feed rate is generally hard to control and the polymer particles produced are not uniform in size. Furthermore, segregation of polymer particles during storage and transfer of polymer can occur thereby producing non-homogeneous products.

An olefin polymer having a multimodal molecular weight distribution can also be produced by a sequential polymerization in two separate reactors or by blending polymers of different molecular weight distribution during processing of polymers. However, both of these methods increase capital and manufacturing costs.

Therefore, there is an ever-increasing need for developing an improved process for an improved catalyst composition which can be used to produce an olefin polymer having a multimodal molecular weight distribution. It would also be a great contribution to the art if an improved catalyst and an olefin polymer produced therefrom were provided.

SUMMARY OF THE INVENTION

An object of this invention is to provide a composition which can be used as a single catalyst for producing an olefin polymer having a multimodal molecular weight distribution. Another object of this invention is to provide a process for preparing the composition. A further object of this invention is to provide a process for using the composition in a polymerization process for producing an olefin polymer having a multimodal molecular weight distribution. Still another object of this invention is to provide a polymerization process for producing an olefin polymer. An advantage of the present invention is the production of an olefin polymer having a multimodal molecular weight distribution by using a single catalyst. Other objects, features, and advantages will become more apparent as the invention is more fully disclosed hereinbelow.

According to a first embodiment of the present invention, a composition, which can be used as catalyst for producing an olefin polymer having a multimodal molecular weight distribution, is provided that comprises a transition metal-containing catalyst, a metallocene, and a boron-containing organoaluminoxane, wherein each component of the composition is present in an effective amount so that an olefin polymer having a multimodal molecular weight distribution can be produced using the composition as catalyst, preferably in the presence of a cocatalyst.

According to a second embodiment of the present invention a process for producing a composition, which can be used as catalyst for producing an olefin polymer having a multimodal molecular weight distribution, is provided that comprises: (1) contacting a transition metal-containing catalyst with an organoaluminoxane dispersed in a solvent to form a slurry; (2) combining the slurry with a boroxine to prepare a combination of a transition metal-containing catalyst and boron-containing organoaluminoxane; and (3) contacting the combination with a metallocene wherein each reactant is present in an effective amount sufficient to prepare the composition which can be used to prepare an olefinic polymer having a multimodal molecular weight distribution.

According to a third embodiment of the present invention, a process for preparing an olefin polymer is provided which comprises contacting an olefin with a composition which comprising a transition metal-containing catalyst, a metallocene, and a boron-containing organoaluminoxane under conditions sufficient to effect the synthesis of an olefin polymer; wherein each component of the composition is present in an effective amount so that an olefin polymer having a multimodal molecular weight distribution can be produced using the composition as catalyst.

DETAILED DESCRIPTION OF THE INVENTION

Figure 1:
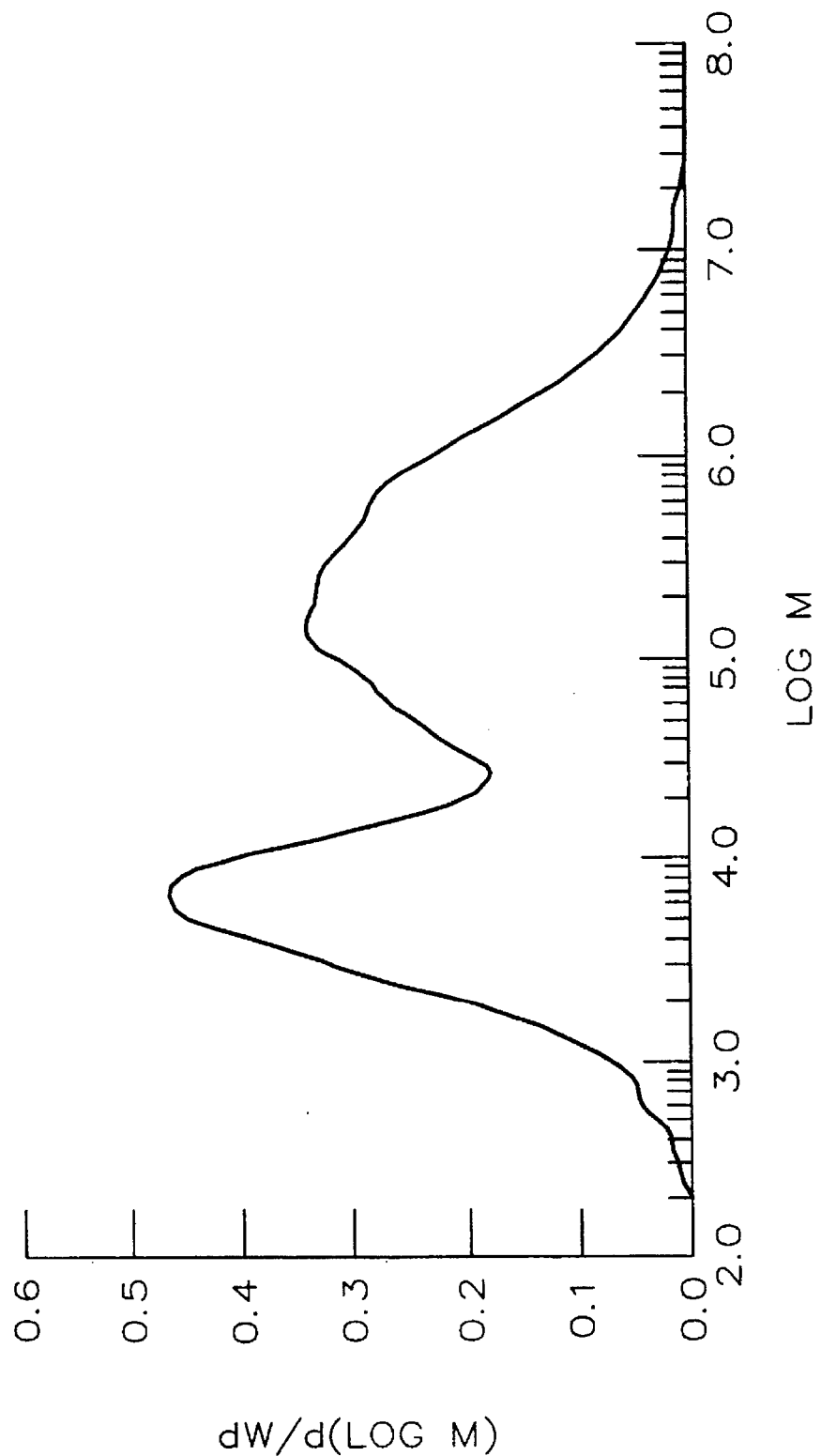
FIG. 1 is a graphic representation of molecular weight distribution of polyethylene produced using the composition of the invention as polymerization catalyst (See Example II for details).

An olefin, as used in this disclosure, is a hydrocarbon molecule having at least one double bond between adjacent carbon atoms and at least one of the double bonds is at the 1-position. The term "olefin polymer", as used in this disclosure, is a polymer having a repeat unit derived from an olefin. The term "olefin polymer" can be a homopolymer, copolymer, terpolymer, tetrapolymer, or combinations thereof. The term can also denote a block or random polymer. The term "bimodal molecular weight distribution" or "multimodal molecular weight distribution" is used in this disclosure to denote a molecular weight distribution plot by size exclusion chromatography wherein two or more peaks of different molecular weight species are in a plot of specific molecular weight as a function of relative proportions of the polymer having the given molecular weight.

According to the first embodiment of the invention, a composition useful as catalyst for producing an olefin polymer having a multimodal molecular weight distribution is provided which comprises a transition-metal containing catalyst, a metallocene, a boron-containing organoaluminoxane; and, optionally, a cocatalyst.

According to the present invention, any transition metal-containing catalyst such as, for example, a Ziegler-Natta catalyst can be employed as a component of the invention composition. Because Ziegler-Natta catalysts are well known to those skilled in the art, the description of such catalysts is omitted herein for the interest of brevity. For example, description and preparation of a Ziegler-Natta catalyst can be found in U.S. Pat. Nos. 4,326,988 and 5,082,882, disclosures of which are incorporated herein by reference.

The presently preferred transition metal-containing catalyst is a titanium-containing catalyst. The presently most preferred transition metal-containing catalyst is a catalyst which is prepared by mixing together a metal halide compound and a transition metal compound to produce a first catalyst component. The first catalyst component can be dissolved in a dry inert solvent to produce a first catalyst component solution. A second catalyst component comprising a precipitating agent as hereinafter defined is mixed with the above mentioned first catalyst component solution to produce a solid catalyst in the form of a slurry. A small but effective amount of olefin polymer can be prepolymerized on the solid catalyst in an amount effective to reduce polymer fines when the catalyst is employed in an olefin polymerization process. According to the invention, the solid catalyst can be treated with a halide ion exchanging source as herein defined to produce a catalyst. When it is also desired to treat the catalyst with a halide ion exchange source, the catalyst can be so treated before or after the prepolymerization step. The thus-treated catalyst can have a small but effective amount of an olefin polymer deposited thereon. Further according to the invention, the reaction of the first catalyst component and the second catalyst component can occur at a temperature in the range of about −100° C. to about 50° C.

For example, a process for making such transition metal-containing catalysts can comprise mixing a first catalyst component solution and a second catalyst component; wherein the first catalyst component is formed by the chemical combination of: (1) a metal halide compound selected from the group consisting of metal dihalide compounds and metal hydroxyhalide compounds and the metal of the metal halide compound is selected from the group consisting of Group IIA metals and Group IIB metals of the Periodic Table of the Elements (70th edition of Handbook of Chemistry and Physics, CRC Press; Boca Raton, Fla.; hereinafter referred to as Periodic Table), and (2) a transition metal compound in which the transition metals are selected from Groups IVB and VB of the Periodic Table and the transition metal is bonded to at least one radical selected from the group consisting of hydrocarbyloxides, amides, imides, and mercaptides; wherein the second catalyst component is a precipitating agent selected from the group consisting of (a) organometallic compounds of Groups I, II, and III of the Periodic Table selected from the group consisting of lithium alkyls, Grignard Reagents, dialkyl magnesium compounds, dialkyl zinc compounds, and hydrocarbyl aluminum halides having 1 to about 20 carbon atoms, (b) metal halides and oxyhalides of metals of Group IIIA, IVA, IVB, VA, and VB of the Periodic Table, (c) hydrogen halide and organic acid halides in which the OH group of a carboxylic acid is replaced with a halogen. More preferably, the catalyst has deposited thereon a prepolymer in an amount in the range of about 1 to about 50 weight percent of the prepolymerized catalyst, wherein the prepolymer is formed by polymerizing monomers selected from the group consisting of aliphatic mono-1-olefins and conjugated dienes having 2 to about 20, preferably 2 to about 10, carbon atoms.

The presently preferred transition metal compounds are titanium tetraalkoxides such as titanium tetraethoxide. The presently preferred metal halides are metal dichlorides such as magnesium dichloride. The presently preferred second catalyst component includes, but is not limited to, ethylaluminum sesquichloride, ethylaluminum dichloride, and diethylaluminum chloride. The presently preferred halide ion exchange source is titanium tetrachloride.

The details for preparation of such a transition metal-containing catalyst can be found in U.S. Pat. No. 4,326,988 as disclosed earlier.

Any metallocene, that can be used as a catalyst, or a component thereof, for the polymerization of an olefin to prepare an olefin polymer, can be used in the present invention. Generally, a metallocene suitable for olefin polymerization is an organometallic compound which is a cyclopentadienyl, or indenyl, or fluorenyl, derivative of a Group IVB, Group VB, Group VIB, or Group VIIB metal, or combinations of two or more thereof, of the Periodic Table.

The cyclopentadienyl, indenyl, or fluorenyl radicals in the metallocenes can be unsubstituted or substituted. The substituents can be, for example, hydrocarbyl radicals containing 1 to 12 carbon atoms; alkoxy radicals containing 1 to 12 carbon atoms; or a halide. Typical hydrocarbyl radicals include methyl, ethyl, propyl, butyl, amyl, isoamyl, hexyl, isobutyl, heptyl, octyl, nonyl, decyl, dodecyl, 2-ethylhexyl, and phenyl. Preferably the hydrocarbyl radicals are alkyl radicals containing 1 to 10 carbon atoms, and more preferably 1 to 6 carbon atoms.

It is also within the scope of the present invention to have two cyclopentadienyl-type radicals which are bonded together by a suitable bridging group containing a bridging element such as carbon, silicon, germanium, and tin. Some examples of such bridged ligands include bis(cyclopentadienyl) methane, bis(indenyl) methane, 1,1-bis(fluorenyl) ethane, (9-fluorenyl)(cyclopentadienyl) methane, (9-fluorenyl)(cyclopentadienyl)(dimethyl) methane, 1,2-bis(indenyl) ethane, and other bridged ligands. A suitable metallocene can also can include mono-, di-, and tricyclopentadienyls and derivatives thereof. The presently preferred metallocenes are metallocene complexes of a Group IVB and Group VB metal of the Periodic Table such as titanium, zirconium, hafnium and vanadium.

Examples of suitable metallocenes include, but are not limited to, bis(cyclopentadienyl)zirconium dichloride, (cyclopentadienyl)(fluorenyl)zirconium dichloride, bis(n-butylcyclopentadienyl)zirconium dichloride, bis(cyclopentadienyl)titanium dimethyl, bis(cyclopentadienyl)zirconium diphenyl, bis(cyclopentadienyl)hafnium diphenyl, bis(cyclopentadienyl)hafnium dimethyl, bis(cyclopentadienyl)zirconium phenyl chloride, bis(cyclopentadienyl)zirconium phenyl bromide, bis(indenyl)zirconium dichloride, bis(fluorenyl)zirconium dichloride, [(cyclopentadienyl)-9-(fluorenyl)dimethylsilane] zirconium dichloride, bis(cyclopentadienyl) zirconium dibromide, bis(cyclopentadienyl) zirconium diiodide, bis(methylcyclopentadienyl) zirconium dichloride, bis(n-butylcyclopentadienyl) zirconium dichloride, bis(cyclopentadienyl) hafnium dichloride, bis(cyclopentadienyl) hafnium dibromide, bis(cyclopentadienyl) hafnium diiodidide, bis(methylcyclopentadienyl) hafnium dichloride, bis(n-butylcyclopentadienyl) hafnium dichloride, bis(cyclopentadienyl) titanium dichloride, bis(methylcyclopentadienyl) titanium dichloride, bis(n-butylcyclopentadienyl) titanium dichloride, bis(cyclopentadienyl) zirconium methyl chloride, bis(methylcyclopentadienyl) zirconium ethyl chloride, bis(n-butylcyclopentadienyl)zirconium phenyl chloride, bis(cyclopentadienyl)hafnium methyl chloride, bis(methylcyclopentadienyl) hafnium ethyl chloride, bis(n-butylcyclopentadienyl) hafnium phenyl chloride, bis(cyclopentadienyl) titanium methyl chloride, bis(methylcyclopentadienyl) titanium ethyl chloride, bis(n-butylcyclopentadienyl)titaniumphenylchloride, bis(cyclopentadienyl)zirconium dimethyl, bis(methylcyclopentadienyl) zirconium dimethyl, bis(n-butylcyclopentadienyl) zirconium dimethyl, bis(cyclopentadienyl) hafnium dimethyl, bis(methylcyclopentadienyl) hafnium dimethyl, bis(n-butylcyclopentadienyl) hafnium dimethyl, bis(cyclopentadienyl) titanium dimethyl, bis(methylcyclopentadienyl) titanium dimethyl, bis(n-butylcyclopentadienyl) titanium dimethyl, pentamethylcyclopentadienyl titanium trichloride, pentaethylcyclopentadienyl zirconium trichloride, pentaethylcyclopentadienyl hafnium trichloride, bis(pentamethylcyclopentadienyl) titanium diphenyl, [(9-fluorenyl)(cyclopentadienyl) methane] zirconium dichloride, [(9-fluroenyl)(cyclopentadienyl)(dimethyl) methane] zirconium dichloride, bis(indenyl) hafnium dichloride, bis(indenyl) titanium diphenyl, bis(indenyl) zirconium dichloride, (9-methylfluorenyl)(cyclopentadienyl)zirconium dichloride and other similar metallocenes. The presently preferred metallocene are (9-methylfluorenyl)(cyclopentadienyl)zirconium dichloride and bis(n-butylcyclopentadienyl) zirconium dichloride due to their good reactivity.

Any organoaluminoxane, that can form a slurry with a transition metal-containing catalyst and the resultant slurry can be combined with a boroxine compound to form a solid, can be used in the present invention. An organoaluminoxane useful in the present invention generally is a compound having the general formula of $-(Al(R)-O)_{p+2}$ where R is an alkyl radical having about 1 to about 20, preferably 1 to 12, carbon atoms and p is a number between 0 and about 100, preferably about 5 to about 50, and most preferably 10 to 40. Examples of suitable organoaluminoxane include, but are not limited to, methylaluminoxane, ethylaluminoxane, propylaluminoxane, isopropylaluminoxane, isobutylaluminoxane, cyclohexylaluminoxane, dodecylaluminoxane, and combinations of two or more thereof. Due to their high productivity, the presently most preferred organoaluminoxane is methylaluminoxane or mixture of methylaluminoxane with other organoaluminoxanes. Organoaluminoxanes, sometimes referred to as poly(hydrocarbyl aluminum oxides) are well known in the art and are generally prepared by reacting an organohydrocarbyl aluminum compound with water. Such a preparation techniques are generally disclosed in U.S. Pat. No. 4,808,561, disclosure of which is incorporated herein by reference. Organoaluminoxanes are commercially available in the form of hydrocarbon solutions, generally aromatic hydrocarbon solutions and combinations of two or more thereof.

Any boroxine that can be used with the organoaluminoxane to form a solid with a transitional metal-containing catalyst can be used in the present invention. Boroxine compounds useful in the invention are represented by the formula $(R'BO)_3$ wherein each R' is selected from the group consisting of hydrocarbyl radicals containing 1 to about 25 carbon atoms, preferably 1 to about 10 carbon atoms, $R''O-R''S-$, $R''_2N-$, $R''_2P-$, and $R''_3Si-$ wherein each R'' is a hydrocarbyl radical containing 1 to about 10 carbon atoms.

Hydrocarbyl boroxines and hydrocarbyloxy boroxines are generally preferred. Examples of hydrocarbyl boroxines include trimethyl boroxine, triethyl boroxine, tri-n-propyl boroxine, tributyl boroxine, tricyclohexyl boroxine, triphenyl boroxine, methyl diethyl boroxine, dimethylethyl boroxine, and mixtures thereof. The currently preferred hydrocarbyl boroxines are trimethyl boroxine and triethyl boroxine.

The term hydrocarbyloxy boroxine refers to compounds of the formula $(R''OBO)_3$ wherein each R'' can be the same or different hydrocarbyl group containing 1 to about 10 carbon atoms. Trialkyloxy boroxines are currently preferred and trimethoxy boroxine is especially preferred.

As described above, each component of the composition is present in an effective amount so that an olefin polymer having a multimodal molecular weight distribution can be prepared when the composition is used as a catalyst to polymerize an olefin. Generally, the weight % of the transition metal-containing catalyst in the combination of the transition metal-containing catalyst and the boron-containing organoaluminoxane can be in the range of from about 0.01 to about 50, preferably about 0.1 to about 30, and most preferably 0.1 to 25 weight %; based on total weight % of the combination equaling 100% wherein the boron-containing organoaluminoxane generally makes up the rest of the combination. The weight % of the metallocene, relative to the combination of the transition metal-containing catalyst and the boron-containing organoaluminoxane, is in the range of from about 0.0001 to about 50, preferably about 0.0005 to about 25, and most preferably 0.001 to 20.

The molar ratio of aluminum to boron in the boron-containing aluminoxane compound is the ratio that can effect the preparation of an olefin polymer having multimodal molecular weight distribution when the composition of the invention is used as catalyst. Generally, the ratio can be in the range of from about 0.01:1 to about 100,000:1, preferably about 0.05:1 to about 50,000:1, and most preferably 0.1:1 to 25,0001. The weight percent of boron in the combination of the transition metal-containing catalyst and boron-containing aluminoxane compound is the weight % that can effect the preparation of an olefin polymer having multimodal molecular weight distribution when the composition of the invention is used as polymerization catalyst and can be in the range of from about 0.0001 to about 20, preferably about 0.0002 to about 15, and most preferably 0.005 to 10 weight %.

Optionally, an organoaluminum can be used as a cocatalyst with the composition of the invention for the synthesis of an olefin polymer. A suitable organoaluminum has the general formula of $R'''_n AlX_{3-n}$ wherein each R''' can be the same or different and is independently selected from linear or branched hydrocarbyl radicals having from 1 to about 20, preferably 10, carbon atoms per radical; each X can be the same or different and is a halogen atom; and n is an integer from 1 to 3. The hydrocarbyl radical can be selected from the group consisting of alkyl, cycloalkyl, aryl, alkaryl, aralkyl radicals, and combinations thereof. Examples of some suitable organoaluminums include, but are not limited to, trimethylaluminum, triethylaluminum, diethylaluminum chloride, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and combinations of two or more thereof. The presently preferred organoaluminum is triethylaluminum since it is readily available and it produces good results.

If an organoaluminum is employed with the composition of the present invention, the ratio of the organoaluminum to the transition metal-containing catalyst can be any ratio as long as the ratio can effectively improve the catalytic activity of the composition of the present invention when used in a polymerization process for producing an olefin polymer. A typical weight ratio such as that disclosed in U.S. Pat. No. 5,082,882 is well-suited to the present invention, disclosure of which is incorporated herein by reference.

The composition of the invention can be produced by the second embodiment of the invention which is described hereinbelow.

According to the second embodiment of the invention, the composition disclosed in the first embodiment of the present invention is prepared by first contacting a transition metal-containing catalyst with an organoaluminoxane in a hydrocarbon solvent. The scope and amount of suitable transition metal-containing catalysts and organoaluminoxanes are the same as those disclosed above in the first embodiment of the invention.

Optionally, a small but effective amount of an olefin polymer (hereinafter referred to as "prepolymer") can be prepared and deposited on a transition metal-containing catalyst to reduce polymer fines when the composition disclosed in the first embodiment of this invention is employed in an olefin polymerization process.

According to the present invention, the prepolymer can be prepared onto a transition metal-containing catalyst, or onto the boron-containing aluminoxane disclosed below, or the composition disclosed above in the first embodiment of the invention. Because the process for preparing a prepolymer deposited onto a catalyst composition is well known to one skilled in the art, the description of the process is omitted herein for the interest of brevity. For example, a process for producing a prepolymer deposited onto a catalyst composition is disclosed in U.S. Pat. No. 4,326,988, disclosure of which is herein incorporated by reference.

The weight of prepolymer on the prepolymerized composition, based on the total weight of the prepolymerized composition, as indicated above, is preferably from about 1 to about 50% by weight of the prepolymerized composition, more preferably from about 3% to about 40%, and most preferably from 5% to 20%, since this results in a catalyst with good feeding characteristics that can produce a polymer having relatively low fines content.

Generally, the organoaluminoxane is first dispersed, preferably dissolved, in a hydrocarbon solvent. The hydrocarbon solvent can be an aliphatic, or aromatic, or mixtures thereof. The presently preferred solvent is an aromatic hydrocarbon, or mixtures of aromatic solvents. Examples of the preferred aromatic hydrocarbons include, but are not limited to, toluenes, xylenes, benzene, and combinations of two or more thereof. The presently most preferred hydrocarbon is toluene because it is readily available. Generally, the quantity of the solvent require is an effective quantity that is sufficient to substantially solubilized the organoaluminoxane.

A transition metal-containing catalyst is then contacted with the organoaluminoxane which is dispersed or dissolved in a solvent. The contacting is carried out under any condition that can effect the preparation of a slurry containing the transition metal-containing catalyst and the organoaluminoxane. It can be carried out with any quantity of solvent at any temperature or under any pressure so long as a slurry can be prepared. Generally, it takes as short as 5 minutes to as long as 20 hours to prepare such a slurry depending on the solvent used as well as temperature and pressure.

In the second step, the slurry is combined with a boroxine compound which is in a hydrocarbon solvent, preferably in an aromatic solvent, to form a combination of a transition metal-containing catalyst and a boron-containing organoaluminoxane wherein the amount of solvent is an amount sufficient to facilitate the preparation of the combination. The scope of the boroxine compound and the hydrocarbon solvent is the same as that described above in the first embodiment and the first step of the second embodiment of the invention.

The amount of boroxine compound employed relative to the organoaluminoxane is the amount sufficient to produce a solid boron-containing organoaluminoxane product in a hydrocarbon solvent and can vary over a wide range depending upon the particular compounds employed and the results desired. The molarity of an organoaluminoxane solution in the hydrocarbon solvent can be approximated by vacuum stripping the solvent from a known volume of aluminoxane solution, weighing the recovered solid, and multiplying the weight of the solid in grams per milliliter by 1000 and dividing by the average molecular weight of the aluminoxy units, (i.e., 58 for methylaluminoxane). While wishing not to be bound by theory, it is presumed that the vacuum stripping removes a substantial portion of any free trialkylaluminum compound.

Generally the amount of organoaluminoxane can be in the range of from about 1 mole to about 1000 moles per mole of the boroxine compound, preferably about 2 moles to about 500 moles, and more preferably from 5 to 200 moles per mole of boroxine compound.

The conditions for combining the slurry with the boroxine are those sufficient to produce a solid product and can vary widely depending upon the particular compounds employed. Generally the temperature will be in the range of from about 0° C. to about 100° C., preferably from about 10° C. to about 100° C., and more preferably from 10° C. to 75° C. Generally the pressure will be in the range of from about 0 psig to about 100 psig, preferably about 0 psig to about 50 psig. The time of reaction will generally be in the range of from about 1 minute to about 72 hours, preferably about 5 minutes to about 30 hours.

It is also within the scope of the present invention to carry out the second step in the presence of a particulate diluent so that the insoluble product becomes deposited upon the particulate diluent. Typical particulate diluents include such inorganic materials as silica, alumina, aluminum phosphate, silica-alumina, titania, kaolin, fumed silica, and the like.

Any molar ratio of the organoaluminoxane or boroxine to the transition metal of the transition metal-containing catalyst, with or without a prepolymer attached thereon, can be employed in the process so long as the ratio enables the preparation of a boron-containing compound. Generally, the molar ratio of the organoaluminoxane to the transition metal can be in the range of from about 0.00001:1 to about 30:1, preferably about 0.0001:1 to about 15:1, and most preferably 0.005:1 to 10:1. The molar ratio of the boroxine to the transition metal is in the range of from about 0.00001:1 to about 30:1, preferably about 0.0001:1 to about 15:1, and most preferably 0.0005:1 to 10:1. Generally, the weight % of titanium in the boron-containing compound can be in the range of from about 0.001 to about 40, preferably about 0.005 to about 30, and most preferably 0.01 to 25 weight %.

It is generally preferred that the second step be carried out while the slurry is being mixed. The order of addition is not important and either component can be added to the other or both can be added simultaneously to a common vessel. After completing the mixing, the resulting slurry is stirred or agitated for a sufficient time as described above, to ensure that mixing of the components is complete. Thereafter, stirring can be discontinued and a solid product is formed which can be recovered by filtration, decantation, or centrifugation. The solid product can then be washed with a suitable material such as a hydrocarbon, e.g., n-pentane, n-heptane, cyclohexane, benzene, xylenes, and mixtures thereof, to remove any soluble material which may be present.

According to the process of the second embodiment of the invention, the combination is then contacted with a metallocene. The scope of the metallocene suitable for use in this step is the same as that disclosed in the first embodiment of the invention.

Any weight % of metallocene and the combination of the transition metal-containing catalyst and the boron-containing organoaluminoxane can be employed in the third step of the process of the second embodiment of the invention so long as the weight % can effectively prepare a composition which can be used as a catalyst for preparing an olefin polymer having a multimodal molecular weight distribution. For example, based on total weight equalling 100%, the weight % of the metallocene can be in the range of from about 0.0001 to about 70, preferably about 0.0001 to about 50, and most preferably 0.0005 to 25 because good polymerization results can be obtained within these ranges.

The conditions for carrying out the third step of the invention process can vary widely so long as it is carried out under such conditions that a composition thus-prepared can be effectively used to prepare an olefin polymer having a multimodal molecular weight distribution. Generally, the conditions described in the second step of the invention process can also be used in the third step.

Alternatively, the contacting of the combination with a metallocene in the third step can also be carried out in-situ during a polymerization process for producing an olefin polymer under polymerization in a polymerization reactor.

It should be noted that the process of the invention (the second embodiment of the invention) can be carried out in any suitable container such as, for example, vials, jars, tubes, other more sophisticated vessels such as stirred autoclaves, and combinations thereof as long as air and moisture can be removed from the container. Because the choice of a suitable container is generally a matter of choice to one skilled in the art, the description of which is omitted herein for the interest of brevity.

It is also emphasized that the compositions of the present invention are prepared in an oxygen free system e.g., absence of air, as well as a dry system i.e., absence of water. Generally a dry box, as known to one skilled in the art, is employed to prepare the compositions of the present invention usually employing a dry, oxygen free atmosphere.

According to the third embodiment of the invention, the composition disclosed in the first embodiment of the invention is employed as catalyst for the synthesis of an olefin polymer having a multimodal molecular weight distribution. While it is not necessary in all instances to employ a cocatalyst with the invention composition (hereinafter referred to as polymerization catalyst) for the synthesis of such an olefin polymer, the use of a cocatalyst is recommended for improving catalytic activity.

A number of cocatalysts can be used to polymerize olefin in the synthesis of an olefin polymer. The presently preferred cocatalyst is an organoaluminum compound having the formula of $R'''_n AlX_{3-n}$ as disclosed above in the first embodiment of the invention.

Polymerization is generally carried out in a heterogeneous system in which the catalyst and cocatalyst are insoluble. It is also within the scope of the present invention to carry out the polymerization in a homogeneous system in which the catalyst and cocatalyst are soluble in the polymerization medium.

The polymerization catalyst is useful for the polymerization of mono-unsaturated aliphatic alpha-olefins having 2 to 10 carbon atoms. Examples of such olefins include, but are not limited to, ethylene, propylene, butene-1, pentene-1, 3-methylbutene-1, hexene-1, 4-methylpentene-1, 3-ethylbutene-1, heptene-1, octene-1, decene-1, 4,4-dimethyl-1-pentene, 4,4-diethyl-1-hexene, 3,4-dimethyl-1-hexene, and mixtures thereof. The catalyst is also useful for preparing copolymers of ethylene or propylene and generally a minor amount, i.e. no more than about 20 mole percent, more typically less than about 15 mole percent, of a higher molecular weight olefin.

Polymerization can be carried out under a wide range of conditions depending upon the particular cocatalyst employed, and the results desired. Examples of typical conditions under which the catalyst can be used in the polymerization of olefins include conditions such as disclosed in U.S. Pat. Nos. 4,326,988; 4,363,746; 4,939,217 and 5,258,344, the disclosures of which are incorporated herein by reference. It is considered that generally any of the polymerization procedures used in the prior art with any transition metal based catalyst systems can be employed with the present compositions.

Any weight ratio of the composition to cocatalyst can be used so long as an olefin polymer having a multimodal molecular weight distribution can be produced. Generally, the weight ratio can be in the range of about 0.0001:1 to about 20:1, and more preferably about 0.0001:1 to about 10:1, and most preferably 0.0005:1 to 5:1. As a general rule, the polymerizations can be carried out in the presence of liquid diluents which do not have an adverse affect upon the catalyst system. Examples of such liquid diluents include butane, isobutane, pentane, hexane, heptane, octane, cyclohexane, methylcyclohexane, toluene, xylene, and mixtures thereof. The polymerization temperature can vary over a wide range. Temperatures typically can be in the range of about −60° C. to about 280° C., more preferably in the range of about 20° C. to about 160° C. Typically the pressure can be in the range of from about 1 to about 500 atmospheres or greater.

The polymers produced with this invention process have a wide range of uses that will be apparent to those skilled in the art from the physical properties of the polymers as shown in the following examples.

EXAMPLES

A further understanding of the present invention is provided by the following examples. In these examples, all runs were routinely carried out using purifies and dried nitrogen which served as a protective gas. The solvents used were dried by passage over activated alumina beds.

EXAMPLE I: Catalyst Preparation

This example illustrates the preparation of a boron-containing aluminoxane (Al-B) compound and the preparation of the coprecipitated boron-containing aluminoxane and transition metal catalyst (Al-B/T) of the present invention.

Small scale preparation of boron-containing aluminoxane compound (Al-B/T$_0$) and the coprecipitated boron-containing aluminoxane and transition metal catalyst compounds (Al-B/T$_1$, Al-B/T$_5$, and Al-B/T$_9$.

All small scale preparation of catalyst compositions were carried out in 10 oz or smaller serum capped pip bottles or 50 mL or smaller serum capped vials. All Lynx® catalysts referred to in the Examples were obtained from Catalyst Resources, Inc., Houston, Tex..

In preparation of the inventive catalysts, methylaluminoxane (MAO) (10 mL of a 1.7M solution in toluene) and 50 mL hexane were placed in a 10 oz pop bottle equipped with a Teflon coated magnetic stir bar. If used, a measured amount of a solid titanium containing catalyst, Lynx® 100 containing 12% Ti, was added to the MAO solution to produce a slurry. Next, trimethoxyboroxine (MeOBO)$_3$ was dissolved in toluene (0.15 g dissolved in 3 mL toluene) and added drop wise (over a period of about 5 minutes) to the stirring slurry. Upon addition of the (MeOBO)$_3$ solution, the boron containing aluminoxane solid formed, incorporating the transition metal catalyst (Lynx® 100) (if present). The solid mixture (Al-B/T$_x$) was collected on a glass filter frit, rinsed with hexanes, and collected.

TABLE I

Preparation of Catalyst

| Solid Mixture | MAO mmol | Ti-Containing Catalyst grams | (MeOBO)$_3$ grams | Yield grams | Wt % Ti-Containing Catalyst |
|---|---|---|---|---|---|
| Al—B/T$_0$ | 17 | — | 0.150 | 0.978 | 0% |
| Al—B/T$_1$ | 17 | 0.010 | 0.147 | 0.944 | 1% |
| Al—B/T$_5$ | 17 | 0.049 | 0.149 | 1.026 | 5% |
| Al—B/T$_9$ | 17 | 0.101 | 0.153 | 1.155 | 9% |

Large scale preparation of the boron-containing aluminoxane compound (Al-B).

To a 10 gallon, glass lined Pflauder reactor was added 6 gallons of hexane. To the hexane was added 1 gallon methylaluminoxane (MAO) solution which contained 7.3 pounds or 6.32 mol MAO dissolved in toluene. The solution was stirred for one hour. To the stirred solution was added 300 mL (MeOBO)$_3$ solution containing 48.7 grams or 0.84 mol dissolved in toluene. The resulting slurry was stirred for about 3.5 hours then decanted to a receiving container where the solids were allowed to settle. The solution phase was decanted and about 2 gallons fresh hexane added as a wash. The slurry was mixed and the solids again allowed to settle. The wash was decanted and another wash applied as before. Finally, the last wash was decanted and the remaining slurry material was collected. The solid Al-B material was collected by filtration and dried. Overall yield of solid Al-B containing compound was about 330 grams. Analysis of the solid indicated that it contained 44.5 Wt % Al and 0.14 Wt % B.

Large scale preparation of a coprecipitated boron-containing aluminoxane and transition metal catalyst compound (Al-B/T$_3$).

The same procedure described above to prepare the boron-containing aluminoxane compound (Al-B) was used except for the following. To the stirred reactor containing both hexane and aluminoxane was added 55 grams Lynx® 100 catalyst slurried in about 300 mL hexane prior to the addition of the (MeOBO)$_3$ solution. Total yield of Al-B/T product was about 380 g. The amount of Lynx® 100 contained in the solid was about 3 Wt %.

Preparation of Dual-Site Catalysts.

The next step in producing the inventive catalyst system involved the treatment of the above solid mixtures with a metallocene. This is accomplished in two ways: (1) prior to use in a polymerization reactor and (2) in-situ during use in a polymerization reactor.

The metallocene treatment prior to introduction into the polymerization reactor was accomplished by slurrying a sample of a solid mixture described above in 5 mL toluene containing 10 mg bis(n-butylcyclopentadienyl)ZrCl$_2$ (M) in a 25 mL vial with a stir bar. The solid mixture sample size was chosen such that the addition of 10 mg (or 0.025 mmol) M would produce a composition in which the MAO/Zr mole ratio in the resulting catalyst would be about 500. The solvent was removed by evaporation in the inert atmosphere dry box and the solid inventive catalysts were recovered.

TABLE II

Preparation of the Dual-Site Catalysts

| Dual-Site Catalyst | Solid Mixture | M mg | MAO/Zr mol ratio |
|---|---|---|---|
| Al—B/T$_0$/M | 0.705 g Al—B/T$_0$ | 10 | 500 |
| Al—B/T$_1$/M | 0.705 g Al—B/T$_1$ | 10 | 500 |
| Al—B/T$_5$/M | 0.736 g Al—B/T$_5$ | 10 | 500 |
| Al—B/T$_9$/M | 0.770 g Al—B/T$_9$ | 10 | 500 |

The preparation of the dual-site catalysts in-situ in the polymerization reactor will be covered in the Example II describing the polymerization reactions.

EXAMPLE II: Polymerization Reactions

Polymerization reactions were conducted in a 1-gallon, stirred autoclave under particle form conditions. A 0.5 mmol aliquot of triethyl aluminum dissolved in hexanes was added under a counter flow of isobutane vapor to the reactor followed by the solid catalyst components. For dual-site catalysts that were prepared in-situ, a solution containing the desired metallocene was charged by syringe. The reactor was sealed and two liters isobutane diluent charged. The reaction temperature was increased to 90° C. Hydrogen was added, measured as a pressure drop from a 300 mL vessel. Comonomer was charged along with ethylene monomer. A total reactor pressure of about 550 psig was then maintained by addition of ethylene on demand for a period of one hour unless specified otherwise. At the end of the reaction, the reactor was rapidly vented and solid polymer was recovered as a white fluff.

The following Table contains reaction results for a series of runs made with (n-butylcyclopentadienyl)ZrCl$_2$ as the metallocene catalyst site (M). All of the dual-site catalysts used below were prepared outside the polymerization reactor and added as a solid. In all of the runs, 50 psi hydrogen was added measured as a pressure drop from a 300 mL vessel and 45 grams 1-hexene was used as comonomer.

TABLE III

Comparison of Dual-Site and Single-Site Catalyst

| Run | Catalyst Type | Catalyst | Wt % Lynx 100 | MAO/Zr | Yield | Activity[a] |
|-----|---------------|----------|---------------|--------|-------|-------------|
| 1 | Dual-Site M-T | 60.2 mg Al—B/$T_1$/M | 1 | 500 | 63.30 | 1051 |
| 2 | Dual-Site M-T | 59.1 mg Al—B/$T_5$/M | 5 | 500 | 198.75 | 3363 |
| 3 | Dual-Site M-T | 59.2 mg Al—B/$T_9$/M | 9 | 500 | 311.52 | 5262 |
| 4 | Single-Site T | 55.3 mg Al—B/$T_1$ | 1 | 500 | 27.76 | 502 |
| 5 | Single-Site T | 52.5 mg Al—B/$T_5$ | 5 | 500 | 163.13 | 3107 |
| 6 | Single-Site T | 63.2 mg Al—B/$T_9$ | 9 | 500 | 420.35 | 6651 |
| 7 | Single-Site T | 5.5 mg Lynx 100 | 100 | — | 320.39 | 58253 |
| 8 | Single-Site M | 52.2 mg Al—B/$T_0$ | 0 | 500 | 22.00 | 421 |

[a]Activity of catalyst was measured as grams of polymer produced per gram of catalyst per hour.

Runs 1, 2, and 3 demonstrate the utility of the catalysts that contained different levels of the T (titanium) catalyst site. The activity of the catalysts was observed to increase with increasing levels of T catalyst component. Runs 4–6 were comparative runs in which the Al-B/$T_x$ catalysts were used but not metallocene (M) was added. Run 7 is a comparative run in which pure T catalyst component is used and Run 8 is a comparative run in which only the M catalyst site is present.

The dry polymer was further analyzed for melt index at 190° C. (MI) in g/10 min using the method of ASTM D1238-65T, condition E; high load melt index (HLMI) at 190° C. in g/10 min using the method of ASTM D1238-65T, condition F; weight average molecular weight (Mw); number average molecular weight (Mn); density (D) in g/cc; and heterogeneity index (HI) which is the ratio of Mw to Mn. These physical property terms and the methods for determining them are well known to those skilled in the art, descriptions of which are therefore omitted herein for the interest of brevity.

The following table contains physical properties of the polyethylene prepared in runs 1–8.

TABLE IV

Properties of Polyethylene Prepared by Catalyst Shown in Table III

| Run | MI | HLMI | Density | Mw/1000 | Mn/1000 | HI |
|-----|------|------|---------|---------|---------|------|
| 1 | 0.03 | 8.5 | 0.9562 | 500 | 7.3 | 68.3 |
| 2 | 0.0 | 0.45 | 0.9472 | 780 | 21.7 | 36.0 |
| 3 | 0.0 | 0.40 | 0.9446 | 743 | 26.2 | 24.8 |
| 4 | 0.0 | 0.26 | 0.9429 | 729 | 86.6 | 8.4 |
| 5 | 0.0 | 0.13 | 0.9349 | 676 | 98.0 | 5.9 |
| 6 | 0.0 | 0.26 | 0.9417 | 581 | 83.1 | 7.0 |
| 7 | 0.0 | 0.23 | 0.9393 | 733 | 84.5 | 8.7 |
| 8 | 4110 | — | 0.9673 | 10 | 3.2 | 3.2 |

In the dual-site runs (1–3), the polymers prepared exhibited bimodal character as indicated by the heterogeneity index and pictorially in FIG. 1 (run 3). The high molecular weight mode increased with increasing amount of T catalyst used in the catalyst composition. The single site catalysts produced a narrow molecular weight distribution.

The following dual-site runs were made using the in-situ method of catalyst preparation. All of the reactions were performed at 90° C. The metallocene (M') used was (9-methylfluorenyl)(cyclopentadienyl)$ZrCl_2$. It was added to the reaction vessel, which contained the T catalyst as described above, as a solution in toluene at a concentration of 1.0 mg/mL. The hydrogen addition was measured as a pressure drop from a 300 mL vessel and 60 grams 1-hexene was used as Comonomer.

TABLE V

Comparison of In-Situ Prepared Dual-Site Catalysts and Single-Site Catalyst

| Run | Catalyst Type | Catalyst 1 | Catalyst 2 | $H_2$ (psi) | Time (hrs) | Yield | Activity |
|-----|---------------|------------|------------|-------------|------------|-------|----------|
| 9 | Dual-Site T-M' | 80.6 mg Al—B/$T_3$ | 1.0 mg M' | 150 | 1.0 | 79.56 | 987 |
| 10 | Dual-Site T-M' | 72.1 mg Al—B/$T_3$ | 1.0 mg M' | 150 | 1.0 | 114.34 | 1586 |
| 11 | Dual-Site T-M' | 104.1 mg Al—B/$T_3$ | 1.0 mg M' | 200 | 1.0 | 132.13 | 1269 |
| 12 | Dual-Site T-M' | 101.3 mg Al—B/$T_3$ | 1.0 mg M' | 200 | 1.0 | 166.52 | 1644 |
| 13 | Single-Site M' | 211.9 mg Al–B | 1.0 mg M' | 150 | 0.5 | 90.49 | 854 |
| 14 | Single-Site M' | 211.9 mg Al–B | 1.0 mg M' | 150 | 0.6 | 107.75 | 862 |
| 15 | Single-Site T | 6.3 mg Lynx 100 | — | 150 | 0.3 | 95.68 | 56952 |
| 16 | Single-Site T | 5.0 mg Lynx 100 | — | 150 | 0.4 | 95.90 | 46032 |
| 17 | Single-Site T | 256.5 mg Al—B/$T_3$ | — | 150 | 1.0 | 274.12 | 1069 |
| 18 | Single-Site T | 82.0 mg Al—B/$T_3$ | — | 150 | 1.0 | 79.48 | 969 |

Runs 9–12 demonstrate the utility of the dual-site catalysts at two different hydrogen levels. Runs 13 and 14 are comparative runs in which only the M' catalyst component was used and Runs 15 and 16 are comparative runs in which on the pure T catalyst site was present. Runs 17 and 18 are comparative runs in which the Al-B/T$_3$ catalyst was used by no metallocene (M') was added. The results are shown in Table VI.

TABLE VI

Physical Properties of Polyethylene Prepared in Table V

| Run | Catalyst Type | MI | HLMI | Density | Mw/1000 | Mn/1000 | HI |
|---|---|---|---|---|---|---|---|
| 9 | Dual-Site T-M' | 0.22 | 16.33 | 0.9474 | 194 | 2.86 | 67.8 |
| 10 | Dual-Site T-M' | 0.26 | 15.59 | 0.9503 | 232 | 3.63 | 63.9 |
| 11 | Dual-Site T-M' | 0.37 | 37.98 | 0.9554 | 208 | 4.72 | 44.1 |
| 12 | Dual-Site T-M' | 0.45 | 44.52 | 0.9559 | — | — | — |
| 13 | Single-Site M' | 460 | — | 0.9511 | 17.4 | 1.53 | 11.4 |
| 14 | Single-Site M' | 109 | — | 0.9546 | 34.4 | 1.75 | 19.6 |
| 15 | Single-Site T | 0.04 | 1.42 | 0.9424 | 262 | 47.97 | 5.5 |
| 16 | Single-Site T | 0.0 | 1.08 | 0.9428 | 222 | 38.94 | 5.7 |
| 17 | Single-Site T | 0.10 | 3.62 | 0.9485 | 222 | 35.94 | 6.2 |
| 18 | Single-Site T | 0.07 | 2.98 | 0.9481 | — | — | — |

Similarly, the in-situ prepared dual-site catalysts (runs 9–11) produced olefin polymers having high heterogeneity index indicating multimodal molecular weight distributions. The single site catalysts (runs 13–17) produced olefin polymers having a narrow molecular weight distribution.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed:

1. A process comprising (1) contacting a transition metal-containing catalyst with an organoaluminoxane dispersed in a solvent to form a slurry; (2) combining said slurry with a boroxine to prepare a combination of a transition metal-containing catalyst and boron-containing organoaluminoxane; and (3) contacting said combination with a metallocene wherein said transition metal-containing catalyst, organoaluminoxane, solvent, and boroxine are each present in an effective amount sufficient to prepare a composition which can be used to prepare an olefinic polymer having multimodel molecular weight distribution.

2. A process according to claim 1 wherein said catalyst is a titanium metal-containing catalyst.

3. A process according to claim 1 wherein said catalyst further comprises deposited thereon a prepolymer of an olefin.

4. A process according to claim 1 wherein the hydrocarbyl radical of said metallocene is selected from the group consisting of cyclopentadienyl, indenyl, fluorenyl, and combinations of two or more thereof; the metal of said metallocene is a metal selected from the group consisting of Group IVB, Group VB, Group VIB, Group VIIB, of the Periodic Table, and combinations of two or more thereof; and said hydrocarbyl radical is unsubstituted or substituted.

5. A process according to claim 1 wherein said metallocene is bis(n-butylcyclopentadienyl)zirconium dichloride.

6. A process according to claim 1 wherein said organoaluminoxane is selected from the group consisting of methylaluminoxane, ethylaluminoxane, propylaluminoxane, isopropylaluminoxane, isobutylaluminoxane, cyclohexylaluminoxane, dodecylaluminoxane, and combinations of two or more thereof.

7. A process according to claim 1 wherein said organoaluminoxane is methylaluminoxane.

8. A process according to claim 1 wherein said boron-containing organoaluminoxane is the reaction product of said boroxine and an organoaluminoxane and said boroxine is selected from the group consisting of trimethyl boroxine, triethyl boroxine, tri-n-propyl boroxine, tributyl boroxine, tricyclohexyl boroxine, triphenyl boroxine, methyl diethyl boroxine, dimethylethyl boroxine, and mixtures thereof.

9. A process according to claim 8 wherein said boroxine is trimethylboroxine.

10. A process according to claim 1 wherein the molar ratio of said organoaluminoxane to said transition metal is in the range of from about 0.00001:1 to about 30:1.

11. A process according to claim 1 wherein the molar ratio of said organoaluminoxane to said transition metal is in the range of from 0.005 to 10:1.

12. A process according to claim 1 wherein the molar ratio of said boroxine to said transition metal is in the range of from about 0.00001:1 to about 30:1.

13. A process according to claim 1 wherein the weight % of said metallocene is in the range of from about 0.0001 to about 70; based on the total weight of said catalyst, boron-containing organoaluminoxane, and metallocene equaling 100%.

14. A process according to claim 1 wherein the weight % of said metallocene is in the range of from 0.0005 to 25; based on the total weight of said catalyst, boron-containing organoaluminoxane, and metallocene equaling 100%.

* * * * *